United States Patent
Abbe et al.

(10) Patent No.: US 6,385,965 B1
(45) Date of Patent: May 14, 2002

(54) SYSTEM FOR ACTIVATING A STEERABLE THRUST-VECTORING NOZZLE FOR A JET PROPULSION SYSTEM USING SEVERAL CIRCUMFERENTIALLY DISTRIBUTED ELASTIC ASSEMBLIES

(75) Inventors: François Abbe, Martignas; Pierre Camy, Saint Medard En Jalles; Georges Habarou, Le Bouscat; Michel Thual, Blanquefort, all of (FR)

(73) Assignee: Societe Nationale d'Etudes et de Construction de Moteurs d'Aviation - S.N.E.C.M.A., Paris (FR)

( * ) Notice: Subject to any disclaimer, the term of this patent is extended or adjusted under 35 U.S.C. 154(b) by 0 days.

(21) Appl. No.: 09/647,455

(22) PCT Filed: Jan. 27, 2000

(86) PCT No.: PCT/FR00/00181

§ 371 Date: Sep. 28, 2000

§ 102(e) Date: Sep. 28, 2000

(87) PCT Pub. No.: WO00/45039

PCT Pub. Date: Aug. 3, 2000

(30) Foreign Application Priority Data

Jan. 29, 1999 (FR) ............................................ 99/01021

(51) Int. Cl.[7] .............................................. F02K 1/00

(52) U.S. Cl. ...................... 60/230; 60/232; 239/269.35

(58) Field of Search ............... 60/230, 237; 269/269.35

(56) References Cited

U.S. PATENT DOCUMENTS

| 3,504,903 A | | 4/1970 | Irwin |
| 3,726,480 A | * | 4/1973 | Miltenberger .......... 239/265.19 |
| 4,363,445 A | | 12/1982 | Bouiller et al. |
| 6,276,126 B1 | * | 8/2001 | Bouiller et al. ............... 60/232 |

* cited by examiner

*Primary Examiner*—Charles G Freay
(74) *Attorney, Agent, or Firm*—Weingarten, Schurgin, Gagnebin & Lebovici LLP

(57) ABSTRACT

A steerable nozzle for a reaction engine comprises a fixed portion (1) for fixing to the engine, a moving portion (2) hinged to the fixed portion, control means (3) for controlling the moving portion, and one or more resilient assemblies (4) disposed between the fixed portion and the moving portion. The nozzle is characterized in that each resilient assembly comprises at least one fixed resilient stud (40) having a first end secured to the fixed portion and a second end, opposite from the first end, secured to a rigid piece (42); and at least one moving resilient stud (41) having a first end secured to the moving portion and a second end, opposite from the first end, secured to said rigid piece (42). In addition, each moving resilient stud (41) is offset relative to each fixed resilient stud (40) in a circumferential direction of the nozzle.

20 Claims, 4 Drawing Sheets

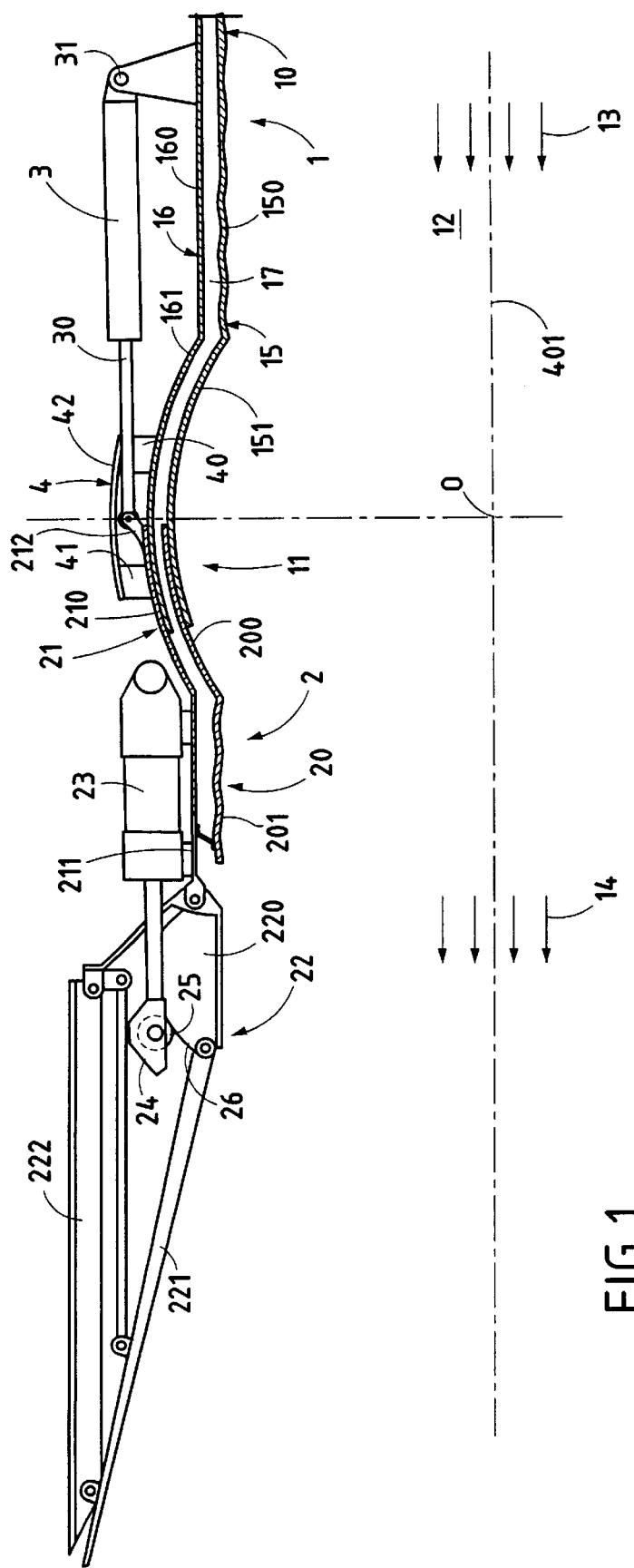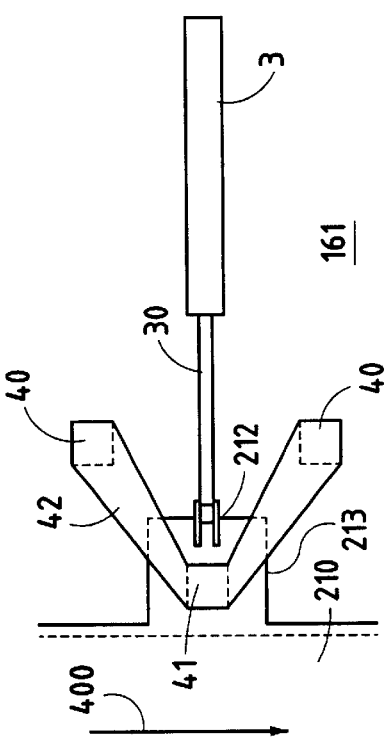
FIG.1
FIG.2

SYSTEM FOR ACTIVATING A STEERABLE THRUST-VECTORING NOZZLE FOR A JET PROPULSION SYSTEM USING SEVERAL CIRCUMFERENTIALLY DISTRIBUTED ELASTIC ASSEMBLIES

FIELD OF THE INVENTION

The present invention relates to a steerable nozzle for a reaction engine, i.e. a nozzle which is capable of steering the jet from a reaction engine.

When such a nozzle is mounted on an airplane, it enables the pilot to vary the pitch and yaw of the airplane quickly (and indeed the roll for a two-engined aircraft).

BACKGROUND OF THE INVENTION

French patent application FR-A-2 470 253 discloses a steerable nozzle comprising a fixed portion secured to an engine and a pivoting portion hinged to the fixed portion and controlled by actuators. The pivoting portion is centered and held relative to the fixed portion by assemblies of resilient elements that are regularly distributed around the circumference of the nozzle and that are disposed in each assembly parallel to the longitudinal axis of the fixed portion. Each of the assemblies is constituted by a fixed resilient element whose base is secured to the fixed portion and whose opposite end is secured to an intermediate ferrule, and a moving resilient element whose base is secured to the pivoting portion and whose opposite end is secured to the intermediate ferrule.

When the pivoting portion is in a position other than its neutral position, i.e. when the jet delivered by the engine and leaving the nozzle is deflected relative to the longitudinal axis of the fixed portion, each assembly of resilient elements is subjected to deformation which has the effect either of moving the bases of the resilient elements apart or else of moving them towards one another. In an extreme position, the base of the moving resilient element comes into abutment against the base of the fixed resilient element, thereby putting a limit on deflection of the moving portion.

OBJECT AND SUMMARY OF THE INVENTION

The present invention seeks to provide a steerable nozzle in which greater deflection of the pivoting portion can be obtained for given size of the resilient means for centering and holding the pivoting portion.

To this end, the invention provides a steerable nozzle for a reaction engine, the nozzle comprising a fixed portion for fixing to the engine, a moving portion hinged to the fixed portion, control means for controlling the moving portion, and one or more resilient assemblies disposed between the fixed portion and the moving portion, the nozzle being characterized in that each resilient assembly comprises:

at least one fixed resilient stud having a first end secured to the fixed portion and a second end, opposite from the first end, secured to a rigid piece; and at least one moving resilient stud having a first end secured to the moving portion and a second end, opposite from the first end, secured to said rigid piece;

said at least one fixed resilient stud and said at least one moving resilient stud being offset relative to each other in a circumferential direction of the nozzle.

Thus, in the invention, the moving resilient stud(s) is/are offset relative to the fixed resilient stud(s) in a circumferential direction, i.e. no moving resilient stud is in register with a fixed resilient stud in an axial direction of the nozzle.

In the neutral or rest position of the moving portion, the moving resilient stud(s) is/are located downstream from the fixed resilient studs in the axial direction. In an extreme position, the first end of each moving resilient stud comes at least level with the first end of the fixed resilient stud(s) in the axial direction, and when a plurality of fixed resilient studs and a plurality of moving resilient studs are provided, the respective first ends of the moving resilient studs are interposed between the respective first ends of the fixed resilient studs. In this way, for given size of the resilient assembly, the stroke of the moving resilient stud(s) is increased so the deflection of the moving portion of the nozzle is likewise increased.

In a particular embodiment of the invention, each resilient assembly comprises two fixed resilient studs and one moving resilient stud positioned circumferentially (about the nozzle) between the two fixed resilient studs. The rigid piece is V-shaped, with the tip of the V-shape being fixed to the moving resilient stud and the other two ends of the V-shape being respectively fixed to the fixed resilient studs.

In another embodiment of the invention, each resilient assembly comprises two moving resilient studs and one fixed resilient stud positioned circumferentially (about the nozzle) between the two moving resilient studs. The rigid piece is V-shaped, with the tip of the V-shape being fixed to the fixed resilient stud and the other two ends of the V-shape being respectively fixed to the moving resilient studs.

Typically, the moving portion is hinged to the fixed portion by ball-and-socket forming means which comprise a fixed spherical bearing surface and a moving spherical bearing surface that is slidable over the fixed spherical bearing surface. The moving spherical bearing surface is connected to the control means. In addition, the first end of the or each fixed resilient stud is fixed to the fixed spherical bearing surface and the first end of the or each moving resilient stud is fixed to the moving spherical bearing surface. More particularly, the or each moving resilient stud is fixed to a projection from the moving spherical bearing surface, said projection being of a shape and a size that enables it to be interposed between two fixed resilient studs.

The control means used for controlling the displacements of the moving portion relative to the fixed portion preferably comprise actuators regularly distributed around the circumference of the nozzle.

The fixed and moving resilient studs are preferably made of a laminated material capable of withstanding the temperature that exists in the nozzle. The laminated material is constituted by a stack of alternating layers of elastomer and metal, a stack of alternating layers of elastomer and an organic composite material, or a stack of alternating layers of elastomer and a thermostructural material. The elastomer is selected from elastomers capable of withstanding temperatures greater than 150° C. By way of example, an elastomer is used that is selected from fluorocarbon and fluorosilicone materials, and from hydrogenated elastomers such as hydrogenated nitril butadiene rubber (HNBR).

The nozzle of the invention can also have steerable flaps secured to the moving portion. By way of example, the steerable flaps can constitute a converging-diverging assembly. Under such circumstances, the flaps are steered in particular to modify the diameter of the nozzle throat, i.e. the diameter of the cross-section defined between the converging flaps and the diverging flaps of the converging-diverging assembly.

BRIEF DESCRIPTION OF THE DRAWINGS

Other characteristics and advantages of the present invention will appear on reading the following detailed description of a plurality of embodiments, and given with reference to the accompanying drawings, in which:

FIG. 1 is a diagrammatic half-section of a steerable nozzle constituting a first embodiment of the present invention;

FIG. 2 is a plan view of a portion of the nozzle shown in FIG. 1;

DETAILED DESCRIPTION OF PREFERRED EMBODIMENTS

Figure 3:
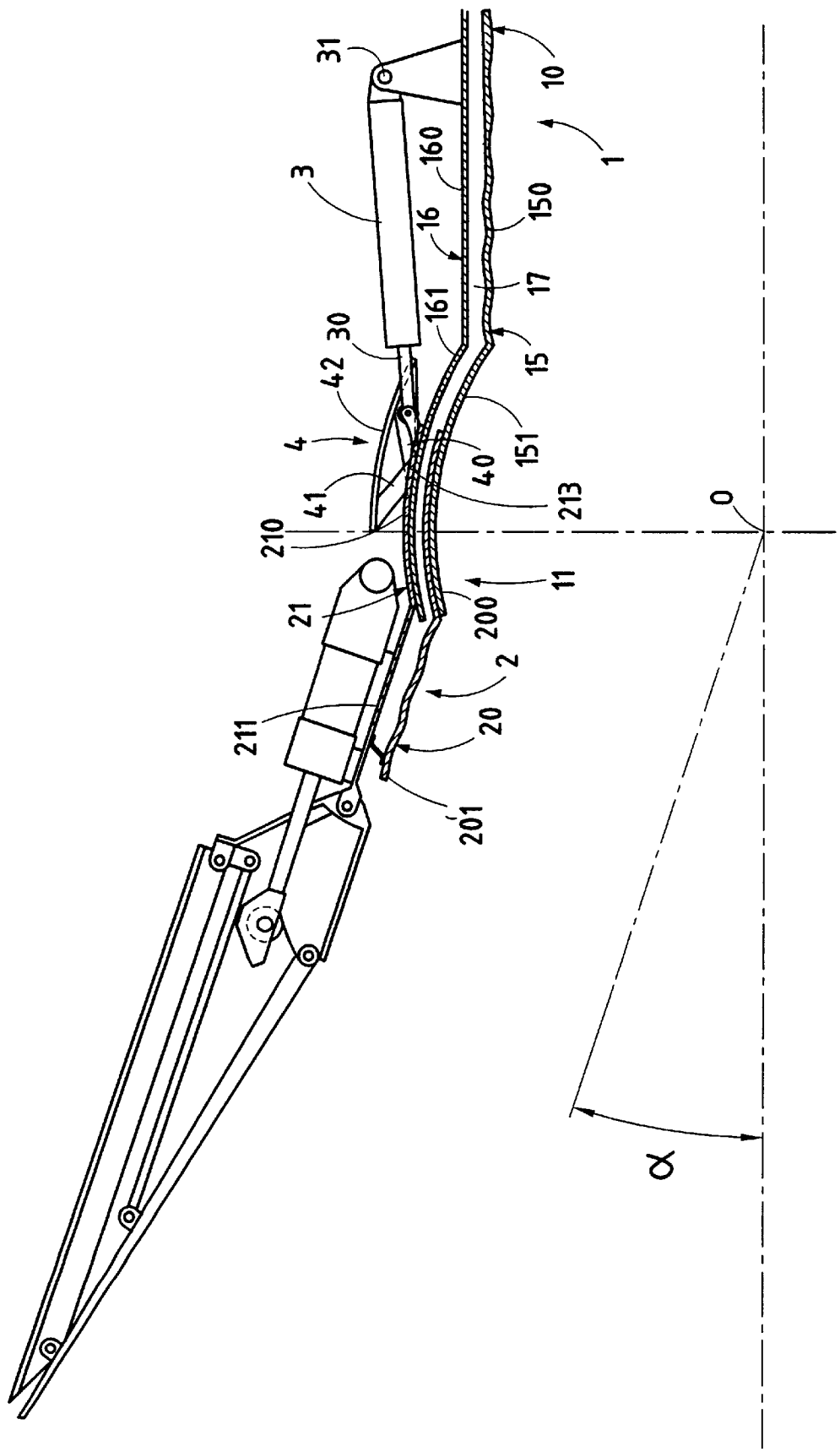
FIGS. 3 and 4 are half-views in section of the FIG. 1 nozzle showing two different positions of a moving portion of the nozzle.

FIG. 1 is a diagram of a steerable nozzle in accordance with the present invention. In general manner, the nozzle comprises a fixed portion 1 secured at an upstream end 10 to a reaction engine (not shown), and a pivoting moving portion 2 which is hinged to a downstream end 11 of the fixed portion 1.

The fixed portion 1 has an ejection channel 12 which receives the gases produced by the engine and which ejects them through the pivoting portion 2, as represented by arrows 13 and 14 in FIG. 1. The ejection channel 12 is delimited by an inner liner 15 constituted by a corrugated cylindrical portion 150 that is extended downstream by a spherical bearing surface 151. An outer wall 16 having the same shape as the inner liner 15 co-operates therewith to define a cooling jacket 17 in which a suitable cooling fluid circulates. The outer wall 16 of the fixed portion 1 comprises a cylindrical portion 160 and a spherical bearing surface 161 disposed respectively in register with the cylindrical portion 150 and the spherical bearing surface 151.

The moving portion 2 comprises an inner liner 20 constituted by a spherical bearing surface 200 extended downstream by a corrugated cylindrical portion 201, and placed in register with a corresponding outer wall 21 constituted by a spherical bearing surface 210 and a cylindrical portion 211. The inner liner 20 and the outer wall 21 are secured to each other. The space defined between the inner liner 20 and the outer wall 21 extends the above-mentioned cooling jacket 17. The moving portion 2 also has an annular assembly of steerable flaps 22 which are described in greater detail below.

The spherical bearing surfaces 151, 161, 200, and 210 have a common center represented by the point O in FIG. 1. These spherical bearing surfaces are organized in such a manner as to form a ball-and-socket joint hinging the moving portion 2 to the fixed portion 1 of the nozzle. More precisely, the moving spherical bearing surfaces 200 and 210 slide respectively over the fixed spherical bearing surfaces 151 and 161 under the control of one or more hydraulic or electrical actuators 3 for steering the pivoting moving portion 2 relative to the fixed portion 1. The actuators 3 are regularly distributed around the circumference of the nozzle. In practice, it is preferable to use at least three actuators disposed at 120° intervals around the circumference of the nozzle. Each actuator 3 has a rod 30 whose free end is secured to a lug 212 on the outer moving spherical bearing surface 210. Each actuator 3 is also hinged at an upstream end 31 to the fixed portion 1. The various actuators are operated synchronously in a manner known to the person skilled in the art.

In accordance with the present invention, resilient assemblies 4 are regularly disposed around the circumference of the nozzle, between the fixed portion 1 and the moving portion 2. In a first embodiment, as shown in FIGS. 1 and 2, each resilient assembly 4 comprises two fixed resilient studs 40, a moving resilient stud 41, and a rigid piece 42. Each of the fixed resilient studs 40 has a first face referred to as a "base" which is fixed to the fixed portion 1 of the nozzle, and more particularly to the outer fixed spherical bearing surface 161, and a second face, opposite to the first face, which is fixed to the rigid piece 42. The resilient stud 41 has a first face which is fixed to the moving portion 2 of the nozzle, and more particularly to a projection 213 having a fixing lug 212 at the end thereof, and a second face, opposite the first face, which is fixed to the rigid piece 42. Typically, the above-mentioned faces are fixed to the fixed and moving portions 1 and 2 and to the rigid piece 42 by adhesive and/or interfitting. The resilient studs are preferably made of a laminated material, i.e. a material constituted by a stack of elastomer layers interposed between reinforcing layers. In the present invention, the elastomer is selected from elastomers capable of withstanding temperatures greater than 150° C. By way of example, the elastomer used is selected from fluorocarbon and fluorosilicone materials, and from hydrogenated elastomers such as hydrogenated nitril butadiene rubber (HNBR). The reinforcement is preferably made of metal, of an organic composite material, or of a thermostructural material such as a carbon-carbon composite material or a ceramic matrix composite material.

As shown in FIGS. 1 and 2, the profile of the rigid piece 42 is substantially spherical, and it is V-shaped with its tip fixed to the moving resilient stud 41 and with its other two ends respectively fixed to the fixed resilient studs 40. The fixed resilient studs 40 are in alignment in a circumferential direction as represented by arrow 400 in FIG. 2, which direction extends orthogonally to a longitudinal axis 401 of the fixed portion 1 of the nozzle. In the neutral position of the nozzle, i.e. when the moving portion 2 is in alignment with the fixed portion 1 as shown in FIG. 1, the projection 213 and the associated stud 41 are offset relative to the fixed resilient studs 40 in the circumferential direction 400. More precisely, the projection 213 and the associated stud 41 are positioned, in the circumferential direction 400, between the fixed resilient studs 40, and, in a direction parallel to the longitudinal axis 401, they are positioned downstream from the fixed resilient studs 40.

Figure 4:
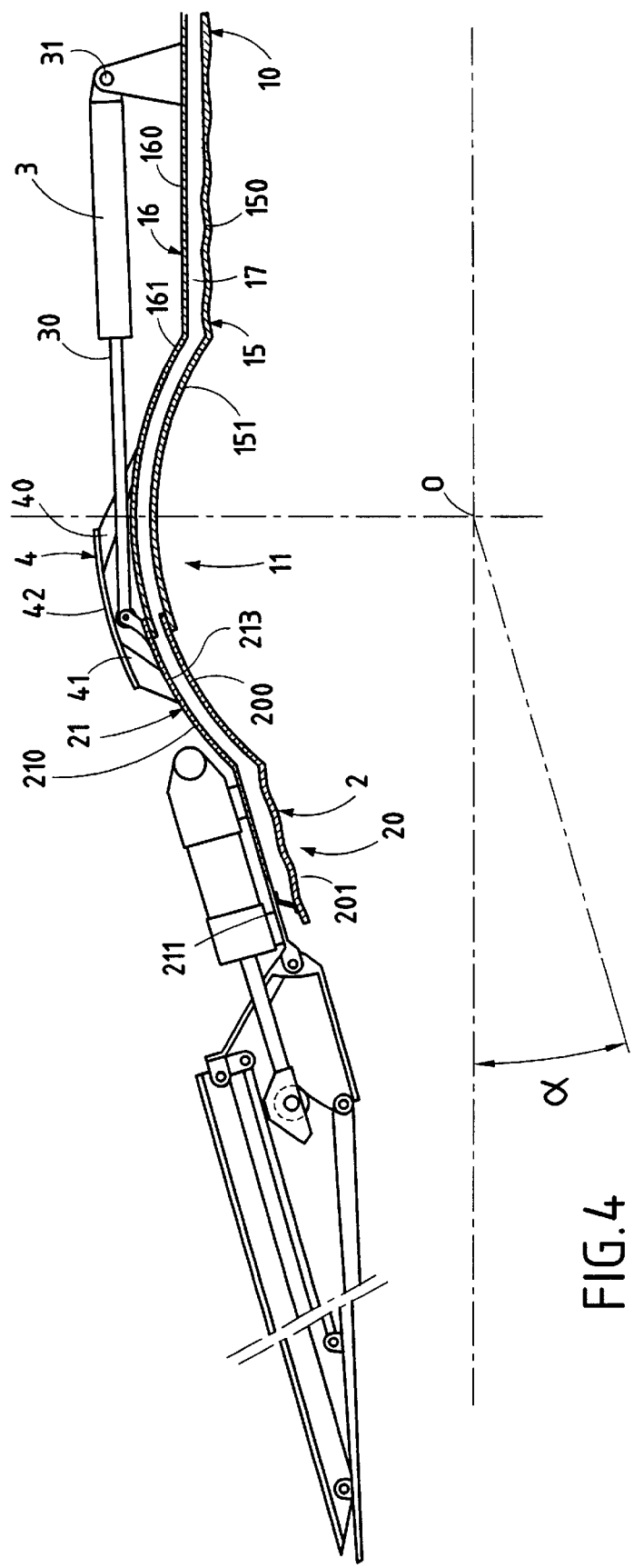

FIGS. 3 and 4 show the configuration of the nozzle when the moving portion 2 is steered upwards or downwards. More particularly, FIGS. 3 and 4 show two extreme configurations of a resilient assembly 4.

In FIG. 3, when the actuator 3 is activated to cause the rod 30 to be withdrawn into the cylinder, the projection 213 of the moving spherical bearing surface 210 is pulled towards the fixed resilient studs 40. In the extreme position, the projection 213 and the base of the moving resilient stud 41 are substantially in alignment with the respective bases of the fixed resilient studs 40 and interposed between them. The fixed and moving resilient studs 40 and 41 are deformed, as shown in FIG. 3. Thus, in the present invention, because the moving resilient stud 41 is offset in the circumferential direction 400 relative to each of the fixed resilient studs 40, the base of the moving resilient stud 41 can be brought to a position that is at least level with the respective bases of the fixed resilient studs 40, while avoiding the base of the resilient stud 41 coming into abutment against either of the bases of the fixed resilient studs 40. Compared with the prior art system consisting in using two resilient studs that come into abutment against each other in the extreme position, the resilient assembly 4 of the present invention makes it possible for given size to deflect the moving portion 2 through a greater angle α, or for given deflection angle α, makes it possible to achieve a smaller axial size. In addition, the general V-shape of the resilient assembly 4 serves to center and hold the moving portion 2 relative to the fixed portion 1 with better stability.

When the actuator 3 is activated so that the rod 30 is extended from the cylinder, then the projection 213 of the moving spherical bearing surface 210 and the associated moving resilient stud 41 are moved away from the fixed resilient studs 40, as shown in FIG. 4.

Figure 5:
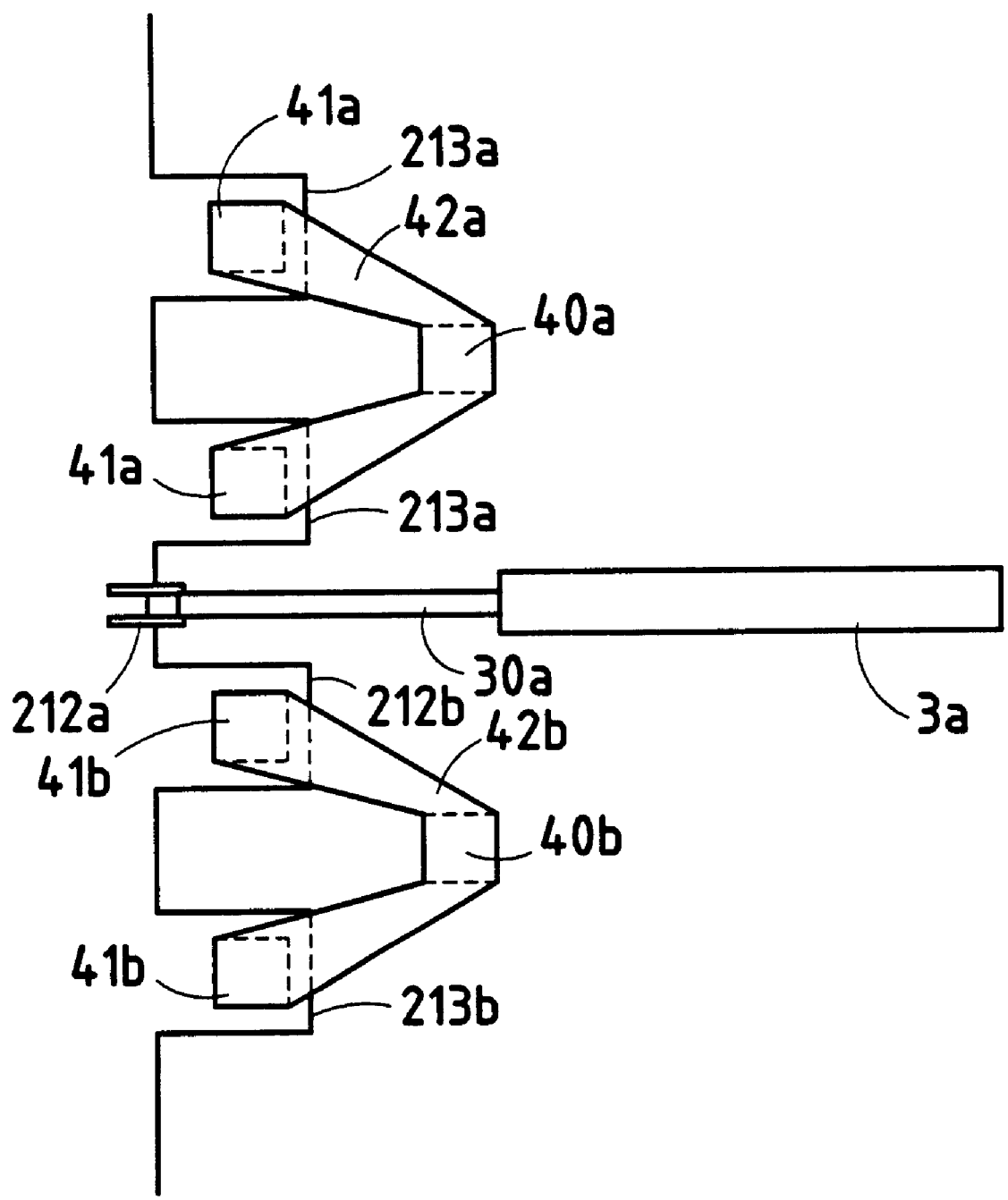
FIG. 5 is a plan view of a portion of a nozzle constituting a second embodiment of the present invention.

FIG. 5 shows a second embodiment of the present invention in which each resilient assembly comprises two moving resilient studs and one fixed resilient stud. In FIG. 5, two resilient assemblies are shown, i.e. an assembly 40a-41a-42a and an assembly 40b-41b-42b. The assembly 40a-41a-42a has two moving resilient studs 41a fixed to respective projections 213a of the moving spherical bearing surface, and a fixed resilient stud 40a fixed to the fixed spherical bearing surface, the studs 41a and 40a being interconnected by a V-shaped piece 42a. The assembly 40b-41b-42b comprises two moving resilient studs 41b fixed to respective projections 213b of the moving spherical bearing surface, and a fixed resilient stud 40b fixed to the fixed spherical bearing surface, the studs 41b and 40b being interconnected by a V-shaped piece 42b. An actuator unit, such as the actuator 3a positioned between the two resilient assemblies serves to move the moving resilient studs in the same manner as in the first embodiment.

In both above-described embodiments, the number of resilient assemblies disposed regularly around the circumference of the nozzle is preferably not less than 3.

As already mentioned, the nozzle of the present invention can also include an annular flap assembly 22 (cf. FIG. 1). The annular flap assembly 22 is secured to the moving spherical bearing surfaces 210 and 201. Its structure is known to the person skilled in the art. In general, the assembly 22 comprises a plurality of adjacent structures mounted circularly on a downstream end of the cylindrical wall 211. Each of these structures comprises a converging flap 220, a diverging flap 221, and a secondary flap 222, also referred to as a "cold" flap. A structure of this type is described in French patent application FR-A-2 561 313. An actuator system comprises actuators 23 (only one of which is shown in FIG. 1) that are regularly distributed around the circumference of the nozzle, a ring 24 having the longitudinal axis 401 of the nozzle as its axis of symmetry and having wheels 25 disposed therein, and cam surfaces 26 over which the wheels 25 are moved, this actuator system serving to modify the orientation of the converging flaps 220 and of the diverging flaps 221 so as to modify the diameter of the throat of the nozzle, and in associated manner the diameter at the outlet from the diverging portion of the nozzle.

The present invention as described above is not limited to the particular number of resilient studs used for each resilient assembly in the various embodiments described. It will be clear to the person skilled in the art that some other number of fixed and moving resilient studs could be used, providing that when the moving portion is in its neutral position, each moving resilient stud is offset relative to each fixed resilient stud in a circumferential direction of the nozzle so that in an extreme position, the base of each moving stud can take up a position in the axial direction of the nozzle that is at least level with the base of a fixed resilient stud. In addition, although the use of a plurality of fixed resilient studs and/or a plurality of moving resilient studs improves stability, it is also possible to use only one fixed resilient stud and only one moving resilient stud to implement each resilient assembly.

What is claimed is:

1. A steerable nozzle for a reaction engine, the nozzle comprising a fixed portion for fixing to the engine, a moving portion hinged to the fixed portion, control means for controlling the moving portion, and one or more resilient assemblies disposed between the fixed portion and the moving portion, the nozzle being characterized in that each resilient assembly comprises:

at least one fixed resilient stud having a first end secured to the fixed portion and a second end, opposite from the first end, secured to a rigid piece; and at least one moving resilient stud having a first end secured to the moving portion and a second end, opposite from the first end, secured to said rigid piece;

said at least one fixed resilient stud and said at least one moving resilient stud being offset relative to each other in a circumferential direction of the nozzle.

2. A steerable nozzle according to claim 1, characterized in that said at least one fixed resilient stud comprises two fixed resilient studs, and said at least one moving resilient stud comprises one moving resilient stud positioned in a circumferential direction of the nozzle between the two fixed resilient studs.

3. A steerable nozzle according to claim 2, characterized in that the rigid piece is V-shaped, the tip of the V-shape being fixed to the moving resilient stud and the other two ends of the V-shape being respectively fixed to the fixed resilient studs.

4. A steerable nozzle according to claim 1, characterized in that said at least one moving resilient stud comprises two moving resilient studs, and said at least one fixed resilient stud comprises one fixed resilient stud positioned in a circumferential direction of the nozzle between the two moving resilient studs.

5. A steerable nozzle according to claim 4, characterized in that the rigid piece is V-shaped, the tip of the V-shape being fixed to the fixed resilient stud and the other two ends of the V-shape being respectively fixed to the moving resilient studs.

6. A steerable nozzle according to claim 1, characterized in that said at least one fixed resilient stud and said at least one moving resilient stud are made of a laminated material.

7. A steerable nozzle according to claim 6, characterized in that the laminated material is constituted by a stack of alternating layers of elastomer and of metal.

8. A steerable nozzle according to claim 6, characterized in that the laminated material is constituted by a stack of alternating layers of elastomer and of an organic composite material.

9. A steerable nozzle according to claim 6, characterized in that the laminated material is constituted by a stack of alternating layers of elastomer and of a thermostructural material.

10. A steerable nozzle according to claim 7, characterized in that the elastomer is selected from elastomers capable of withstanding temperatures greater than 150° C.

11. A steerable nozzle according to claim 10, characterized in that the elastomer is selected from fluorocarbon and fluorosilicone materials, and hydrogenated elastomers.

12. A steerable nozzle according to claim 1, characterized in that the moving portion is hinged to the fixed portion by means, defining a center of rotation.

13. A steerable nozzle according to claim 12, characterized in that the means defining a center of rotation comprise a fixed spherical bearing surface and a moving spherical bearing surface that is slidable over the fixed spherical bearing surface, and in that the moving spherical bearing surface is connected to the control means.

14. A steerable nozzle according to claim 13, characterized in that the first end of said at least one fixed resilient stud is fixed to the fixed spherical bearing surface, and the first end of said at least one moving resilient stud is fixed to the moving spherical bearing surface.

15. A steerable nozzle according to claim 14, characterized in that each moving resilient stud is fixed to a projection of the moving spherical bearing surface, said projection being of a shape and a size enabling it to be interposed between two fixed resilient studs.

16. A steerable nozzle according to claim 1, characterized in that the control means comprise actuators which are regularly distributed around the circumference of the nozzle.

17. A steerable nozzle according to claim 1, characterized in that said resilient assemblies are regularly distributed around the circumference of the nozzle.

18. A steerable nozzle according to claim 1, further comprising steerable flaps secured to the moving portion.

19. A steerable nozzle according to claim 2, characterized in that:

said at least one fixed resilient stud and said at least one moving resilient stud are made of a laminated material;

the laminated material is constituted by a stack of alternating layers of elastomer and of one of a metal, an organic composite material and a thermostructural material;

the elastomer is selected from elastomers capable of withstanding temperatures greater than 150° C.;

the elastomer is selected from fluorocarbon and fluorosilicone materials, and hydrogenated elastomers;

the moving portion is hinged to the fixed portion by means defining a center of rotation;

the means defining a center of rotation comprise a fixed spherical bearing surface and a moving spherical bearing surface that is slidable over the fixed spherical bearing surface, and in that the moving spherical bearing surface is connected to the control means;

the first end of said at least one fixed resilient stud is fixed to the fixed spherical bearing surface, and the first end of said at least one moving resilient stud is fixed to the moving spherical bearing surface;

each moving resilient stud is fixed to a projection of the moving spherical bearing surface, said projection being of a shape and a size enabling said projection to be interposed between two fixed resilient studs;

the control means comprise actuators which are regularly distributed around the circumference of the nozzle;

said resilient assemblies are regularly distributed around the circumference of the nozzle; and further comprising steerable flaps secured to the moving portion.

20. A steerable nozzle according to claim 4, characterized in that:

said at least one fixed resilient stud, and said at least one moving resilient stud are made of a laminated material;

the laminated material is constituted by a stack of alternating layers of elastomer and of one of a metal, an organic composite material and a thermostructural material;

the elastomer is selected from elastomers capable of withstanding temperatures greater than 150° C.;

the elastomer is selected from fluorocarbon and fluorosilicone materials, and hydrogenated elastomers;

the moving portion is hinged to the fixed portion by means defining a center of rotation;

the means defining a center of rotation comprise a fixed spherical bearing surface and a moving spherical bearing surface that is slidable over the fixed spherical bearing surface, and in that the moving spherical bearing surface is connected to the control means;

the first end of said at least one fixed resilient stud is fixed to the fixed spherical bearing surface, and the first end of said at least one moving resilient stud is fixed to the moving spherical bearing surface;

each moving resilient stud is fixed to a projection of the moving spherical bearing surface, said projection being of a shape and a size enabling said projection to be interposed between two fixed resilient studs;

the control means comprise actuators which are regularly distributed around the circumference of the nozzle;

said resilient assemblies are regularly distributed around the circumference of the nozzle; and further comprising steerable flaps secured to the moving portion.

* * * * *

UNITED STATES PATENT AND TRADEMARK OFFICE
CERTIFICATE OF CORRECTION

PATENT NO.    : 6,385,965 B1
DATED         : May 14, 2002
INVENTOR(S)   : Francois Abbe et al.

It is certified that error appears in the above-identified patent and that said Letters Patent is hereby corrected as shown below:

<u>Title page,</u>
Item [73], Assignee, "Societe Nationale d'Etudes et de Construction de Moteurs d'Aviation" should read -- Societe Nationale D'Etude et de Construction de Moteurs D'Aviation--.

Signed and Sealed this

Fifth Day of August, 2003

JAMES E. ROGAN
*Director of the United States Patent and Trademark Office*